United States Patent [19]

Hirose et al.

[11] Patent Number: 4,856,777
[45] Date of Patent: Aug. 15, 1989

[54] SIMULATOR TOY

[75] Inventors: Tomiyuki Hirose; Hiroyuki Shimizu, both of Tokyo, Japan

[73] Assignee: Tomy Kogyo Co., Inc., Tokyo, Japan

[21] Appl. No.: 191,367

[22] Filed: May 9, 1988

[30] Foreign Application Priority Data

Jun. 24, 1987 [JP] Japan ................................ 62-156282

[51] Int. Cl.$^4$ .............................................. A63F 9/00
[52] U.S. Cl. ................................................. 273/1 GA
[58] Field of Search ......................... 273/1 GA, 1 GB; 434/62–65, 32

[56] References Cited

U.S. PATENT DOCUMENTS

| | | | |
|---|---|---|---|
| 3,575,413 | 4/1971 | Furukawa | 273/1 GA |
| 3,690,657 | 9/1972 | Nakamura | 273/1 GA |
| 4,167,822 | 9/1979 | Weir et al. | 273/1 GA X |
| 4,340,219 | 7/1982 | Saito et al. | 273/1 GA |
| 4,589,660 | 5/1986 | Tzuzuki | 273/1 GA |

Primary Examiner—Paul E. Shapiro
Attorney, Agent, or Firm—Staas & Halsey

[57] ABSTRACT

A simulator toy has a projection light source and plate with projectable objects formed on one surface so that when the plate is rotated, the projected image simulates a moving street. A projectable car is movable under the rotation plate by a turning knob. A player uses the turning knob to manipulate the car around the projectable objects.

17 Claims, 5 Drawing Sheets

SIMULATOR TOY

BACKGROUND OF THE INVENTION

1 Field of the Invention

The present invention relates generally to an image-projecting toy, and more particularly, to a simulator toy for simulating driving a car by steering a projected image of a car on a running street and around obstacles such as buildings.

2 Description of the Related Art

It is generally known to provide a simulator toy with an endless film or a transparent disk displaying a desired image located at the rear side of a transparent screen. The images are projected onto a screen or other projection surface by a light source. It is also known to use a cathode ray tube (CRT) to display pre-recorded images by means of a computerized electronic control system.

The known endless film or transparent disk simulators produce inadequate images and cannot achieve satisfactory matching between the images projected and an actuating mechanism such as a handle or an operation rod. As a result, the player is unable to experience the sensation of driving.

CRT simulators using an electronic control system are more realistic, but because of the large scale and expense of CRT simulators, they are not appropriate for use as toys.

SUMMARY OF THE INVENTION

An object of the invention is to provide a simulator toy which is capable of projecting realistic images and the sensation of motion to simulate driving a car.

Another object of the invention is to provide a simulator toy that simulates driving a car and scores a player's driving abilities.

Another object of the invention is to provide a light weight, hand-held simulator toy.

Another object of the invention is to provide a simulator toy that is compact, relatively inexpensive, and made substantially of molded plastic parts to lighten the overall weight.

These and other objects of the invention are achieved by providing a simulator toy including a body having a front portion, a rear portion, an upper portion, and a lower portion, a rotation plate having an upper surface with projectable structures formed thereon and a lower surface with abutments formed thereon corresponding to the position of projectable structures, a projection member linearly movable under the rotation plate and having a projectable car image, drive means located within the body for rotating the rotation plate, a projecting light source supported above the rotation plate and being movable with the projection member, and a turning knob disposed outside the body for moving the projection member around the abutments on the lower surface of the rotation plate while the rotation plate is rotating.

These and other features and advantages of the simulator toy of the present invention will become more apparent with reference to the following detailed description and drawings.

DETAILED DESCRIPTION OF THE PREFERRED EMBODIMENTS

Figure 1:
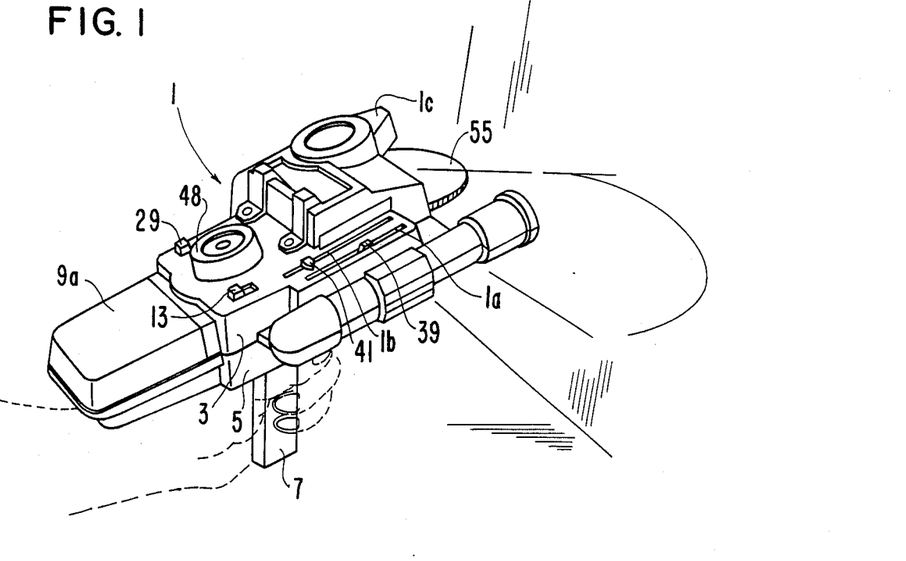
FIG. 1 is a perspective view of a preferred embodiment of the simulator toy as it projects images onto a projection surface or screen.
Figure 2:
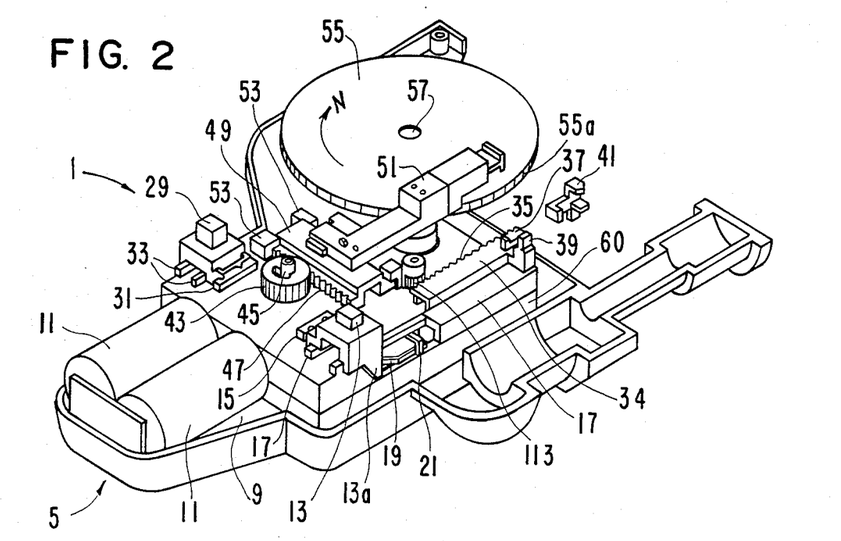
FIG. 2 is a perspective view of the simulator toy of FIG. 1 with the upper shell half of the body removed.

Referring to FIGS. 1 and 2, the simulator toy has a main body 1 made of an upper shell body 3 and a lower shell body 5. The two shells are connected by any conventional means such as threaded fasteners. The front of the main body 1 is open so that a rotation plate 55 (to be described later) can be loaded and unloaded through the open front. The front of the upper shell 3 may have a lid member 1c fitted thereto which is removable to facilitate loading and unloading of the rotation plate 55. Alternatively, lid 1c may be integrally formed with the upper shell 3, in which case a forward portion of the lid 1c would be provided with a door which pivots upwardly above the rotation plate to allow access. A turning knob 48 is located on a central part of the upper shell 3 and is used to move a car, as will be described later. The turning knob 48 also functions as a steering wheel for steering the car.

A grip 7 extends downwardly from a lower surface of the lower shell 5 and is detachably connected thereto. A player supports the main body 1 by gripping the grip 7 with one hand and manipulates the turning knob 48 with the other hand. Slots 1a and 1b are formed parallel to each other in the upper shell 3. An indicator 41 projects through the slot 1b from inside the body 1 and is slidable in a longitudinal direction within the slot 1b. The indicator 41 displays a score when the simulator toy is used to play a simulated driving game. The score is indicated by the position of the indicator 41 with respect to a scale having numeric values (not shown) along the slot 1b. Tab 39 is slidable within slot 1a and is integrally formed with a slide plate 34 (FIG. 2) having a rack 35 and a push plate or abutment 37. Abutment 37 pushes indicator 41 to the right in FIGS. 1 and 2 while the rotation plate 55 is rotating since the slide plate 34 is driven by the drive mechanism. If the indicator 41 is pushed back to its starting position, the tab 39 is also forced to return. However, if the tab 39 is pushed back to the start position, the indicator 41 remains in the score indicating position so that the next player can compare his or her score, indicated by the tab 39, to the previous score, indicated by indicator 41.

FIG. 2 shows the main body 1 with the upper shell 3 removed. A battery cell storage section 9 is located at the rear of the body 1 and houses battery cells 11 which are covered by a lid 9a (see FIG. 1). The battery cells 11 are preferably "D" size. The lid 9a is easily removed for loading and unloading battery cells 11 as needed. The lower shell 5 houses a frame or casing 60 which contains a driving mechanism, to be described later.

In FIGS. 1 and 2, a main power switch 13 extends through a slot provided in the upper shell 3 and is slidable within the slot between ON and OFF positions. The lower portion of the main switch 13 is guided by guide projections 17 which are integrally formed with and project upwardly from the casing 60. A speed control knob 29 also extends upwardly through an opening provided in the upper shell 3 and has a lower portion guided by guide projections 33 which are integrally formed with and project upwardly from the casing 60.

Figure 4:
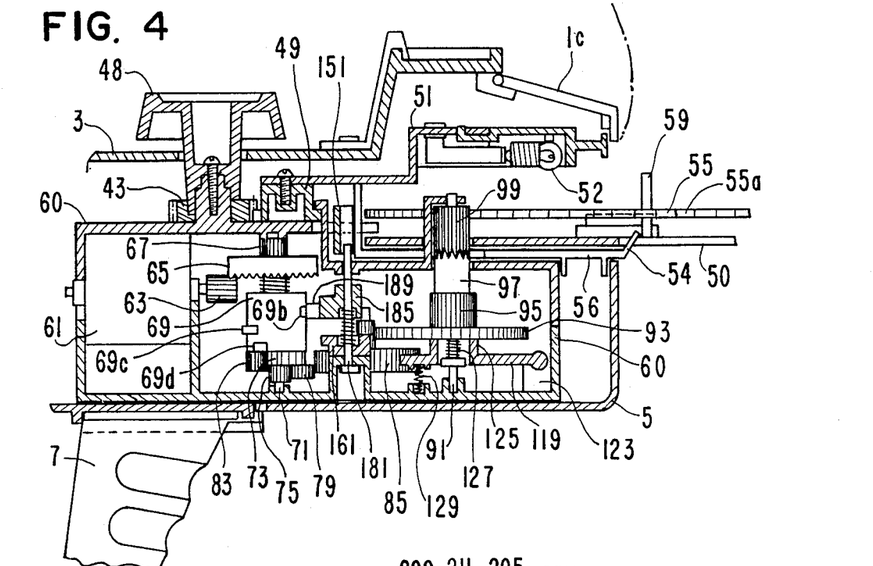
FIG. 4 is a vertical cross-sectional view of the embodiment of FIG. 1.

Referring to FIG. 4, a distal end portion of a supporting arm 51 houses a lamp 52 which is disposed over the rotating plate 55. A branch plate 56 is substantially parallel to the supporting arm 51 and may be connected thereto at a proximal end. Alternatively, the supporting arm 51 and the rotating plate 55 could be interconnected at the sliding member 49. The distal end of the branch plate 56 has a car silhouette projection 54 formed thereon. The projection 54 forms a projected car image on a projected surface when the lamp 52 is illuminated. In other words, projection 54 becomes a projected image of a car.

The projection 54 is disposed in a position to be engaged with an obstacle projection (to be described later) provided on a lower surface of the rotation plate 55. The proximal end of the supporting arm 51 is mounted on the sliding member 49 which is slidably supported on an upper surface of the casing 60. As shown in FIG. 2, the sliding member 49 is slidable in a direction transverse the longitudinal axis of the body 1 and is guided in its sliding movement by guide members 53 integrally formed with the upper surface of casing 60. A rack 47 is formed on one side of the sliding member 49 and engages a pinion 43 which rotates about a stud 45 upstanding from the upper surface of casing 60. The turning knob 48 is connected to the pinion 43 so that rotation of the turning knob 48 imparts rotation of the pinion 43. By turning the turning knob 48, the sliding member 49 moves in either transverse direction of the main body 1 so that the lamp 52 attached to the supporting arm 51 moves above the rotation plate 55 and, in particular, over the right hand side of the rotation plate 55. At the same time, branch plate 56 moves under the rotation plate 55.

Figure 8:
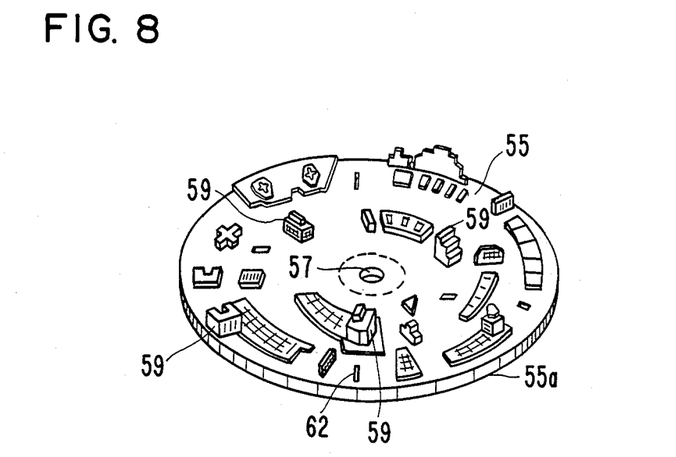
FIG. 8 is a perspective view of a rotation plate which is a part of the embodiment of FIG. 1.
Figure 9:
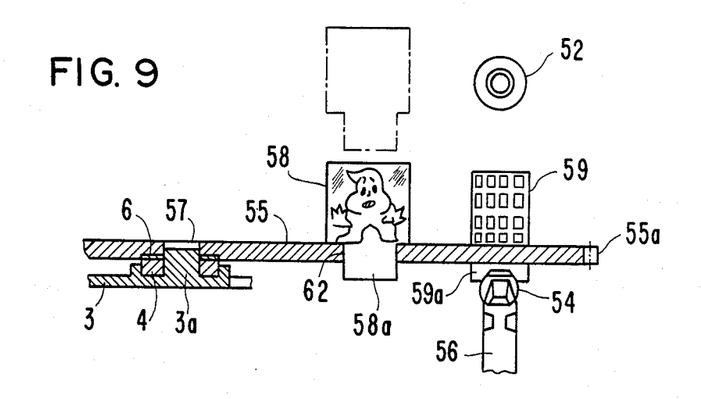
FIG. 9 is a detailed cross-sectional view of a portion of the rotation plate of FIG. 8.

Referring to FIGS. 8 and 9, the rotation plate 55 is made of a transparent material which is capable of light transmittance. A plurality of three-dimensional, solid body projections or forms 59 extend upwardly from an upper surface of the rotation plate 55. These solid body forms 59 may be in the shape of buildings, gas stations, cars, trees, mountains, etc., or other suitable structures which act as driving obstacles. Some of the forms 59 may be made by stacking disks with increasingly larger diameter. All of the solid body forms 59 are made of a transparent synthetic resin or the like which is opaque at the surfaces thereof to render the image thereof projectable. The transparent synthetic resin may be a colored transparent synthetic resin. In any event, the solid body forms 59 are projected onto the projection surface as silhouettes. Moreover, the rotation plate 55 may have slits 62 formed therein to which a transparent plate 58 having a desired pattern printed thereon can be inserted. The transparent plate 58 is used to provide ghost-like figures as obstacles. The level of difficulty of the game played with the illumination toy is increased by providing obstacles which extend upwardly from the rotation plate 55. A player can play on a higher level of difficulty by increasing the number of transparent plates 58 inserted into the rotation plate 55.

The lower surface of the rotation plate 55 is provided with obstacle abutments 58a and 59a which correspond to transparent plates 58 and solid body forms 59, respectively. The obstacle abutments 58a and 59a are coplanar with the car-like projection 54 formed at the tip of the branch plate 56 associated with the supporting arm 51. While the rotation plate 55 is rotating, a player must turn the turning knob 48 (which is connected to the supporting arm 51) to manipulate the projection 54 around the obstacle abutments 58a and 59a. If the projection 54 comes into contact with the obstacle abutment 59a, as shown in FIG. 9, the rotation plate 55 is prevented from rotating and the image projected on the projection surface shows the collision of the projected car and a projected structure.

The outer peripheral surface of the rotation plate 55 is provided with gear teeth or rack 55a which meshes with a gear of a driving mechanism (to be described later). The central portion of the rotation plate 55 is provided with a through hole 57 for receiving a supporting shaft 3a which is formed on a plate 50 spaced above the branch plate 56. A metal ring 6 is recessed into the rotation plate 55 around the through hole 57. The metal ring 6 is attracted by a permanent magnet 4 which is located around the supporting shaft 3a so that the rotation plate 55 is supported for rotation about the supporting shaft 3a without support from above. The metal/magnet arrangement could be reversed so that the magnet would be disposed in the rotation plate 55.

The driving and timing mechanisms housed in casing 60 will now be described with reference to FIGS. 3 and 4.

A rail 13c is parallel to and spaced outwardly from a side surface of the main switch 13, and has a detent (not shown) formed on an outer surface thereof which is receivable in either of two substantially concave indentations 15a provided on an opposing bar 15 formed on an upper surface of the casing 60 to hold the main switch 13 in OFF and ON positions. The rail 13c is elastically deformable so that the detent is urged into the indentation when aligned therewith.

A downwardly extending arm 13a of the main switch 13 actuates a conductive contact 19 which is connected to the casing 60 at an end 14 near the switch 13. An opposite, free end 15 of the conductive contact 19 moves in and out of electrical contact with a bent portion 21b of a conductive contact 21 by virtue of the spring force of the conductive contact 19 which is spring biased into electrical contact. The tip 21a of conductive contact 21 is arcuately shaped so as to engage and disengage a timer mechanism (to be described later).

Conductive contact 23 is disposed in a spaced, parallel relationship relative to the conductive contact 21. The tip 22 of the conductive contact 23 moves in and out of electrical contact with the conductive contact 21, with the contact position being shown in FIG. 3. The timer mechanism acts to break the electrical contact between conductive contact 23 and 21 by flexing conductive contact 21 outwardly away from tip 22 of contact 23.

A protrusion 13b extends downwardly from the main switch 13 from an opposite side from which the arm 13a extends. The protrusion 13b has a sloped caming surface 16 formed at a lower end thereof. The caming surface 16 is movable into and out of engagement with an upper end of shaft 145 by axially sliding the main switch 13. Forward movement of switch 13 imparts downward movement to the shaft 145. A gear 147 connected to the shaft 145 moves into engagement or disengagement with a worm gear 143, depending on the position of the switch 13. Alternatively, the gear 147 could be axially movable along and rotatably about the shaft 145, which remains fixed in. Downward movement of the gear 147 could be initiated by surface 16 coacting with an upper end face of a central cylindrical portion of cam 149. A gear 141 affixed to the shaft 139 engages a worm gear 137 which is connected to a shaft 135. A gear 133 connected to the shaft 135 meshes with a pinion gear 67 which is connected to a shaft 71. A crown gear 65 connected to the shaft 71 meshes with a pinion gear 63 connected to an output shaft of motor 61.

The shaft 145 has a cam 149 connected thereto, and the tip of the cam engages the tip 21a of the conductive contact 21. A compression spring 27 disposed around the shaft 145 biases the shaft 145 upwardly. A pin 147a extends downwardly from a lower surface of the gear 147, and a tension spring 25 is hooked to the pin 147a.

The shafts used in the simulator toy can be journaled at opposite ends in the upper and lower walls of the casing 60, which is made of plastic. Due to the light load, the plastic material provides an adequate bearing.

The timer mechanism includes a plurality of transmission gears including crown gear 65 and gear 147, and all gears in between. The timer mechanism also includes the cam 149 and the conductive contact 21. The length of time allowed for playing a game using the illumination toy is set by the timer mechanism. For instance, when the main switch 13 is moved in the forward direction (arrow "F" in FIG. 3), the arm 13a cams the conductive contact 19 so that the tip 15 moves away from the bent portion 21b of the conductive contact 21. As a result, the circuit connecting the motor 61 and a power source is opened and the motor is stopped. The caming surface 16 of the protrusion 13b then causes the gear 147 to move downwardly against the compression spring 27, whereupon the gear 147 disengages from the worm gear 143. The gear 147 and cam 149 are then rotated substantially to the position shown in FIG. 3, which is a beginning position, by virtue of the tension spring 25. The tip of the cam 149 is stopped in proximity to the tip 21a of the conductive contact 21. At this position, the conductive contact 23 is in contact with conductive contact 21.

When the main switch is moved in the reverse direction (arrow "R" in FIG. 3), which is the "on" position, the arm 13a slides out of engagement with caming surface 17 of the conductive contact 19 and the tip 15 of the conductive contact 19 moves into contact with bent portion 21b of conductive contact 21. As a result, the circuit connecting the motor 61 and the power source is closed and the motor 61 is driven. Thus, the gear 147 and the cam 149 are rotated clockwise. The tension spring 25 stretches and winds on a boss (not shown) provided on the shaft 145 at the lower side of the gear 147. Substantially one revolution of the cam 149 causes the tip of the cam 149 to engage the tip 21a of the conductive contact 21 and flex the conductive contact 21 out of contact with conductive contact 23. Thus, the contact between conductive contacts 21 and 23 is broken and the circuit between the motor 61 and the power source is opened, whereupon the motor 61 is stopped.

To drive the motor 61 again, the main switch 13 is moved in the forward direction. The tip 15 of the conductive contact 19 is moved away from the bent portion 21b of conductive contact 21 and the "off" condition is obtained. Also, the gear 147 is moved downwardly by the caming surface 16 of the protrusion 13b and becomes disengaged from the worm gear 143. The spring force of the tension spring 25 causes the gear 147 and the cam 149 to rotate counterclockwise to the position shown in FIG. 3 with the tip of the cam 149 juxtaposed to the tip 21a of the conductive contact 21. In this position, the tension spring 25 is in a non-stretched condition and the conductive contacts 21 and 23 are in contact with each other.

Figure 3:
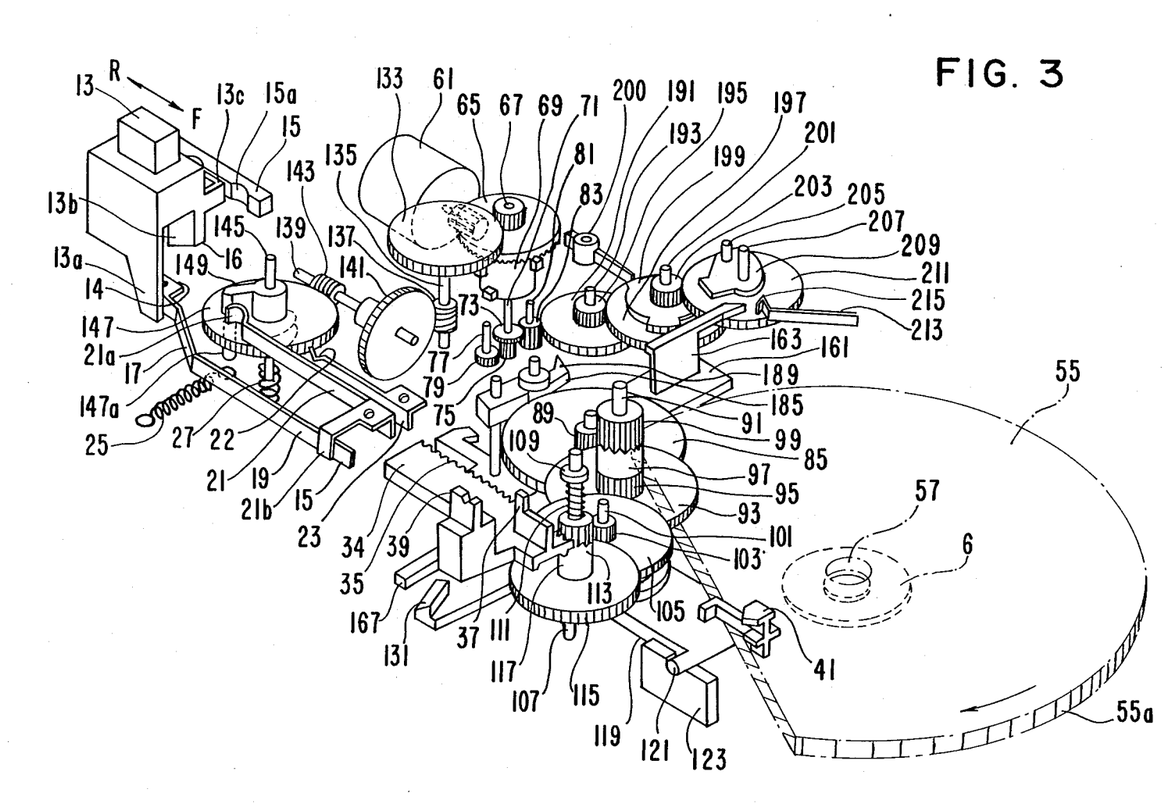
FIG. 3 is an exploded view of a portion of the driving mechanism which is a part of the embodiment of FIG. 1.

The timer mechanism is reset by sliding the main switch 13 in the forward direction as shown in FIG. 3. After resetting is completed, the motor 61 can be driven again when the main switch 13 is moved to the ON position by moving switch 13 in the reverse direction.

Referring to FIGS. 3-7, a driving mechanism for rotating the rotation plate 55 includes the motor 61 and pinion gear 63 which engages the crown gear 65 connected to an upper portion of the shaft 71. The shaft 71, a rotatable body 69 and rotatable gears 79 and 83 are used for shifting the transmission of driving force. The shifting mechanism basically has the same features as the "gear switching mechanism" disclosed in Japanese Pat. Publication No. 56-333117, having the same inventorship as the present invention. More specifically, the motor pinion gear 63 engages the crown gear 65 connected to an upper portion of the shaft 71. The drumlike rotatable body 69 is mounted for rotation about a central portion of the shaft 71. Gears 73 and 75 are connected to the lower end of the shaft 71. The lower end of the rotatable body 69 is provided with shafts 77 and 81 which are journaled in the body at diametrically opposite sides of shaft 71. Rotatable gear 79 is rotatably supported by shaft 77 and engages gear 75. Rotatable gear 83 is rotatably supported by shaft 81 and engages gear 73. Rotation of the shaft 71 causes gears 65, 73 and 75 and body 69 to rotate. If the shaft 71 is held from rotation while body 69 is rotated, or vice versa, gears 79 and 83 are caused to rotate about their shafts 77 and 81, respectively, and revolve as planetary gears around gears 73 and 75.

Protrusions 69a, 69b, 69c and 69d are spaced at predetermined angles to each other circumferential around the cylindrical rotatable body 69 and at predetermined axial intervals. A rotatable pawl 185 is located in proximity to the rotatable body 69 and is connected to axially slidable shaft 181 which is supported on the frame 60, as shown in FIG. 4.

Figure 7:
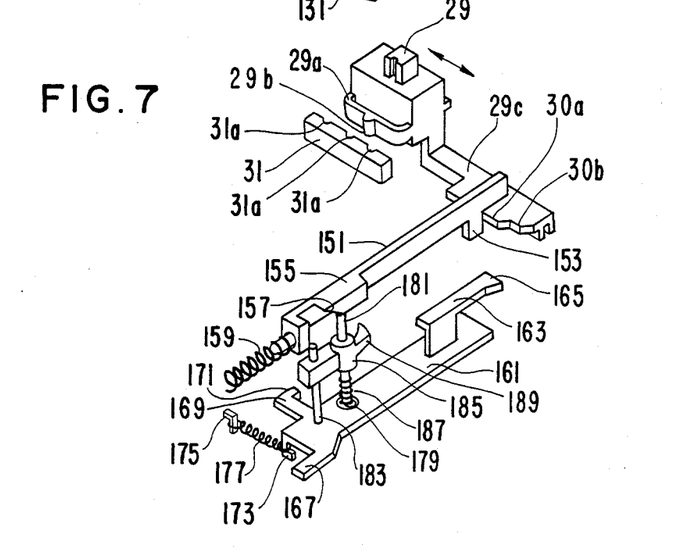
FIG. 7 is a perspective view of the speed control mechanism which is a part of the embodiment of FIG. 1.

As shown in FIG. 7, an end portion of the rotatable pawl 185 has a bore which slidable receives a shaft 183. The shaft 183 extends upwardly from the rotatable lever 161 so that the end portion of the rotatable pawl 185 is free to slide axially along the shaft 183. A compression spring 187 disposed around the shaft 181 biases the rotatable pawl 185 upwardly with the shaft 181. The tip 189 of the rotatable pawl 185 is positioned to engage and disengage the protrusions 69a, 69b and 69c provided in the rotatable body 69.

Figure 5:
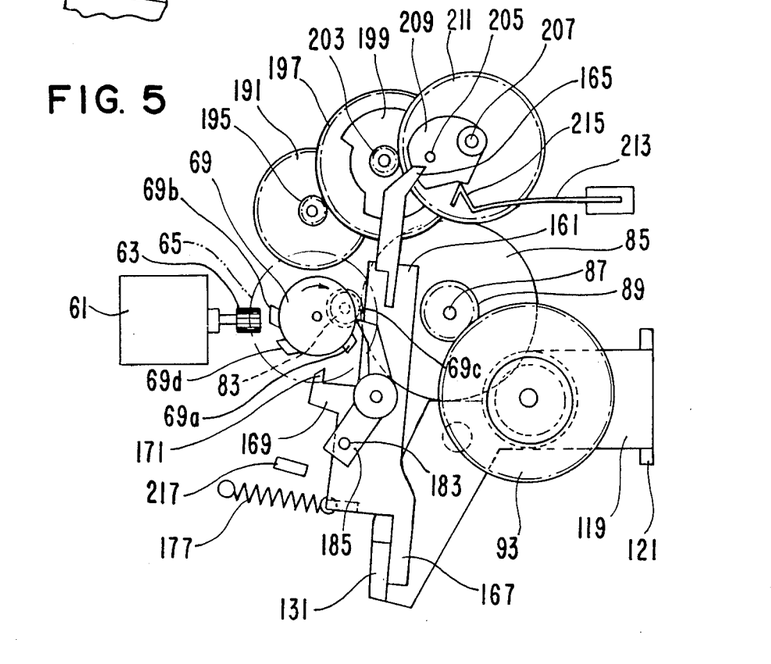
FIG. 5 is a plan view showing a portion of the driving mechanism which is a part of the embodiment of FIG. 1.
Figure 6:
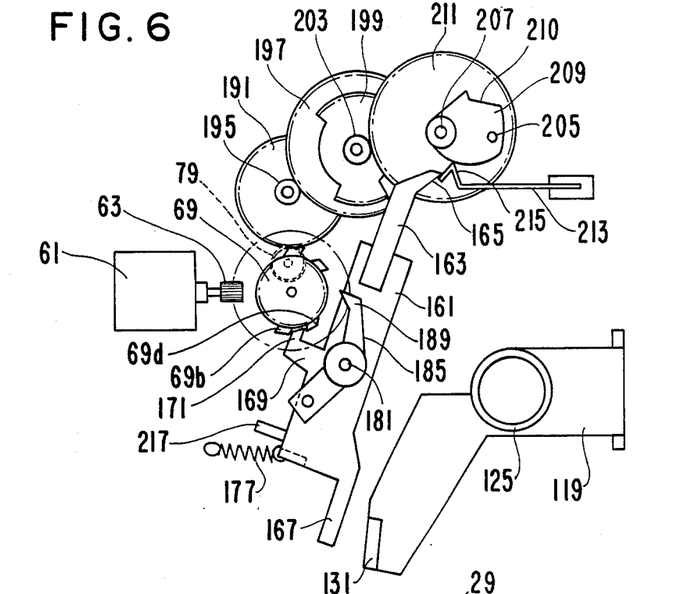
FIG. 6 is a plan view of the drive mechanism which is a part of the embodiment of FIG. 1.

The rotatable lever 161 is capable of rotating about the shaft 181, with bearing hole 179 acting as a fulcrum. A tension spring 177 extends between a hook 173 associated with an end of the rotatable lever 161 and a catch 175 associated with the casing 60. The force of the tension spring 177 moves the rotatable lever 161 clockwise as shown in FIGS. 5 and 6. Rotatable lever 161 is provided with a detent 163 having a tip 165. The proximal end of the rotatable lever 161 is provided with a radial extension 169 having a tip 171. The tip 171 of the radial extension 169 is positioned to engage and disengage the protrusion 69d provided on the outer cylindrical surface of the rotatable body 69.

A sliding bar 151 is located above the rotatable lever 161. A compression spring 159 is provided at a proximal end of the sliding bar 151, which is thereby spring biased to the right. At the distal end of the sliding member 151, a radially downwardly extending arm 153 is positioned to engage and disengage a first engaging step 30a and a second engaging step 30b formed on a side of the slider 29c. Slider 29c is integrally formed with the speed control knob 29. An abutment 155 provided on the sliding bar 151 includes a caming surface 157 which is positioned to engage the upper end of the shaft 181.

The speed control knob 29 is provided with a broad U-shaped piece 29a which is elastically deformable in an inward direction. The elasticity of the U-shaped piece 29a facilitates the movement of detent 29b in and out of concave recesses 31a provided in the surface of a bar 31 which is integrally formed on the upper surface of the casing 60 at a position next to the speed control knob 29. Selectable speeds are determined by the position of the detent 29b.

When the motor 61 is driven, the relatively large diameter gear 73 and the gear 75 are caused to rotate with the shaft 71. The gear 73 causes gear 83 to rotate, and gear 75 causes gear 79 to rotate. Gears 73 and 75 provide driving force in the same direction to the rotatable body 69 through shafts 81 and 77 of the rotatable gears 83 and 79, respectively. Rotatable gears 83 and 79 are supported on shafts 81 and 77, respectively, and are rotatably operated as if inter-locked with the rotatable body 69.

A gear 85 is positioned to be pressed into engagement with rotatable gears 83 and 79, thereby transmitting rotational driving force to the rotation plate 55. When the speed control knob 29 is moved to the left (as seen in FIG. 2), the slider 29c integrally formed with the speed control knob 29, as seen in FIG. 7 is moved to the left so that the abutment 155 comes to its uppermost position. At this moment, the tip 189 of the already rotatable pawl 185 engages the protrusion 69a provided on the outer peripheral surface of the rotatable body 69. When the tip 189 engages the protrusion 69a, rotation of the rotatable body 69 is prevented, so that the rotatable body 69 idles while being supported on the shaft 71. Thus, while the gears 83 and 79 are rotating, they do not engage any of the other gears for driving the rotation plate 55. In this "neutral" state, the rotation plate 55 and a counter mechanism (to be described later) are stopped and the timer mechanism is actuated.

When the speed control knob 29 is pushed to the right (in FIG. 7) and then stopped by the detent 29b catching the concave recess 31a provided on the central portion of the bar 31, the arm 153 of the sliding bar 151 engages the second engaging step 30b. As a result, the upper end of the shaft 181 is pressed downwardly by the caming surface 157 formed on the abutment 155. The tip 189 of the rotatable pawl 185 is then removed from the protrusion 69a. Since the rotatable body 69 is always subject to the force of rotation given in a predetermined direction, the protrusion 69b is rotated by a predetermined angle until it catches the tip 189 of the rotatable pawl 185. Rotation of the body 69 is thereafter inhibited. The rotatable gear 79 which is rotated by meshing with the relatively smaller diameter gear 75, transmits driving force to the rotation plate 55 so as to rotate the rotation plate 55 at low speed.

When the speed control knob 29 is moved to the right (in FIG. 7), the arm 153 of the sliding bar 151 engages the first engaging step 30a. The shaft 181 whose upper end is pressed downwardly by the caming surface 157 of the abutment 155 is lowered to its lowermost position. At that moment, the tip 189 of the rotatable pawl 185 is separated from the protrusion 69b of the rotating body. The rotatable pawl 185 is then lowered to a position where the tip 189 becomes engaged with the protrusion 69c. The force of rotation which is always experienced by the rotatable body 69 serves to rotate the protrusion 69c by a predetermined angle, whereupon the protrusion 69c engages the tip 189 of the rotatable pawl 185, and rotation of the rotatable body 69 is stopped. Thereafter, the rotatable gear 83 rotated by meshing with the larger diameter gear 73 becomes engaged with the gear 85. Thus, the rotation plate 55 is rotated at high speed, as shown in FIG. 5.

The gear 85 is located to allow its peripheral teeth to mesh with the teeth of rotatable gears 79 and 83. The shaft 87 supporting the gear 85 has a pinion 89 connected thereto which is engagable with a gear 93 which is connected to a shaft 91. A pinion gear 95 is disposed next to the gear 93, and a clutch member 97 is interposed between pinion gear 95 and pinion gear 99, which is rotating about the shaft 91. Thus, the gear 99 can move axially along the shaft 91. A push spring 127, disposed at a lower portion of the shaft 91, serves to push the gear 93 upwardly. The clutch 97 consists of mating ends of opposing clutch portion, which may include opposing tooth surfaces or undulating surfaces, formed on the lower end of a pinion gear 99 and the upper end of pinion gear 95. The pinion gear 99 engages teeth 55a formed on the outer peripheral surface of the rotating body to drive the same.

A description of the counter mechanism for displaying a score for a game played using the simulator toy is set forth below with reference to FIGS. 3–7.

The gear 95 meshes with a gear 115 connected to shaft 107. A clutch 117 is disposed between gear 117 and pinion gear 113. Gear 115 and the lower portion of clutch 117 rotates with the shaft 107, while pinion gear 113 and the upper half of the clutch cam either rotate with or about the shaft 107. Clutch 107 and clutch 97 are similarly constructed. The clutch 107 may include radially engaging teeth formed on the upper end of the gear 115 and lower end of pinion gear 113. A compression spring 111 is disposed around the shaft 107 at the upper portion thereof. The upper end of the compression spring 111 presses on a collar 109 connected to the shaft 107, while the lower end presses on an upper end face of the gear 113. Compression spring 111 forces the pinion gear 113 into engagement with the clutch 117 and in effect provides the frictional engagement of the two respective clutch parts. The pinion gear 113 engages a rack 35 formed on a sliding plate 34. The sliding plate 34 has an L-shaped projection 37 formed on an upper surface thereof, and the tab 39 formed on one side. The rotation plate 55 is rotated during game play as a result of engagement with pinion gear 99 which is driven with gear 95 through clutch 97. Pinion gear 95 rotates gear 105 and pinion gear 103. Pinion gear 113 meshes with rack 35 associated with sliding plate 34 and causes the sliding plate 34 to move axially forwardly.

As the sliding plate 34 moves forwardly, push plate 37 pushes forwardly the indicator 41, while the tab 39 advances. At the end of the game, the indicator 41 can be pushed backwards and the score indicator tab 39 will also be pushed backward by the push plate 37. Alternatively, the tab 39 can be pushed backward to the "zero" score position, and the indicator 41 will remain in a reference score position. A scale of numeric values (not shown) lies between the indicator 41 and the tab 39. The scale and position of the tab 39 will indicate a score obtained in one game. When the tab 39 is moved to the left as shown in FIG. 3, upon completion of the game, the pinion gear 113 which was previously engaged with the rack 35, jumps over the engaging teeth of the lower portion of clutch member 117 and moves upwardly in opposition to the push spring 111. Pinion gear 113 rotates while the sliding plate 34 is returned to the original position, but gear 115 does not.

A description is set froth below of the driving mechanism in the state when the projection 54, projected by a light source as a car, is engaged with the obstacle projections 58a and 59a provided on the lower surface of the rotation plate 55.

A lever 119 is located below the gear 93 which is axially movable along the shaft 91. The shaft 91 has a pinion gear 99 connected thereto for transmitting driving force to the rotation plate 55. The lever 119 has a pivot shaft 121 which is supported on bearing member 123 formed integrally with the casing 60. A cylinder 125 extends upwardly from an upper surface of the lever 119. The upper end of the cylinder 125 abuts the lower end face of gear 93. A compression spring 129 is disposed between the bottom of the casing 60 and the lower, central portion of the lever 119. The compression spring 129 forces the lever 119 upwardly. The lever 119 is provided with a catch 131 at a distal end thereof which engages and disengages an extension 167 of a rotatable lever 161.

When the rotation plate 55 is rotated, a projection 54 formed on the tip of the branch plate 56, which is movable in unison with the supporting arm 21, is movable into abutment with one of the obstacle abutments 58a or 59a provided on a rear surface of the rotation plate. When abutment occurs, rotation of the rotation plate is prevented. The clutch member 97 operates to allow continued rotation of gear 93 while pinion gear 99 is stopped with the rotation plate 55. When pinion gear 99 is stopped, gears 93 and 95, along with the lower half of clutch 97, move downwardly with lever 119. The downward movement of lever 119 releases the catch 131 from the extension 167 of the rotatable lever 161.

The rotatable lever 161 is rotated about the shaft 181 in a clockwise direction as shown in FIG. 6 until it abuts a stop 217 when the tip 189 of the rotatable pawl 185 is disengaged from the protrusion 69b or 69c provided on the rotatable body 69. The tip 171 of the radial extension 169 formed on the rotatable lever 161 is moved to a position where it engages the protrusion 69d provided on the rotatable body 69. When rotation of the rotatable body 69 is prevented by abutment of the tip 171 with the protrusion 69d, the gear 79 or 83 is spaced from the gear 85. In other words, rotation of the rotatable plate 55 is stopped when the gear 79 engages gear 191, as shown in FIG. 6.

The driving mechanism, which includes the gear 191, is connected to means for actuating a sound mechanism for playing the sound of a collision when a car collides with an obstacle projection. The gear 191 is connected to rotatable shaft 193 and is positioned to mesh with rotatable gear 79 as seen in FIG. 6. A pinion gear 195 is connected to the rotatable shaft 193 above the gear 191 and engages a gear 197 connected to a rotatable shaft 201. Rotatable plate 199 is connected to the rotatable shaft 201 above the gear 197 and has a plurality of projections formed on a peripheral surface thereof. The projections engage the tip of an elastic piece 200 in order to make a clicking sound. The rotatable plate 197 could be positioned below gear 199 and could have other shapes which cause noise when contacted by elastic piece 200.

A pinion 203 connected to an upper end of the rotatable shaft 201 engages a gear 211 which is connected to a rotatable shaft 207. A cam plate 209 is connected to the rotatable shaft 207 above the gear 211, and is provided with an upwardly extending pin 205. An elastic piece 213 is located in proximity to the cam plate 209 and has a bent portion 215 which rides on a cam surface of the cam plate 209.

The rotatable plate 199 which is rotated by a driving force transmitted by the rotatable gear 79 serves to oscillate the elastic piece 200 to make a clicking sound. Nearly one rotation of the cam plate 209 clockwise as shown in FIG. 6 causes the pin 205 to engage the tip 165 of the engaging pawl 163 provided on the rotatable lever 161. Rotatable lever 161 then rotates counterclockwise as shown in FIG. 6. The extension 167 of the rotating lever 161, which has been rotated by the engagement of rotatable pawl 163 with pin 205, engages catch 131 formed on the tip of the moving lever 119. The moving lever 119 is moved upwardly to an engagement position by means of the push spring 129. At the moment of engagement, the tip 171 of the catch 169 releases from engagement with the protrusion 69d of the rotatable body so that the rotatable body 69 is rotated and the protrusions 69b or 69c is engaged by the tip 189 of the rotatable pawl 185. When the extension 167 of the rotatable lever 161 is engaged with the catch 131 of the moving lever 119, the pin 205 pushes the tip 165 of the engaging pawl 163 from the rear. Then, the bent portion 215 of the elastic piece 213 is in a position immediately before a linear segment 210 of the cam surface of the cam plate 209. The gear 191, which is spaced from the rotatable gear 79, is rotated slightly by inertia, and the bent portion 215 jumps over the point located just before the segment 210 and thereafter becomes engaged with the segment 210. Afterwards, the cam plate 209 is forced to rotate by means of the elasticity of the elastic piece 213, thereby shifting the pin 205 in advance of the catch 131. As a result, the sound mechanism for indicating a collision is in an inactive state, whereupon the rotatable gear 79 or 83 engages the gear 85 and transmits driving force to the rotation plate 55 so as to enable the game to be continued.

During play, a player looks at an image projected on a projection surface. By manipulating a handle or knob, a player can avoid collision with projected images of solid bodies which are provided on the rotation plate 55 and formed of translucent material. The rotation plate 55 rotates as if interlocked with the driving mechanism located in the main body. Since the solid body forms are three dimensional, a good three dimensional effect is provided in the images projected by the simulator toy.

What is claim is:

1. A simulator toy comprising:
    a body having a front portion, a rear portion, an upper portion and a lower portion, a rotation plate having an upper surface with projectable structures formed thereon and a lower surface with abutments formed thereon corresponding in position to the position of the projectable structures, a projection member linearly movable under the rotation plate and having a projectable vehicle image at a distal end thereof, drive means located within the body for rotating the rotation plate, a projecting light source supported above the rotation plate and being movable with the projection member, and a turning knob for moving the projection member around the abutments on the lower surface of the rotation plate while the rotation plate is rotatable.

2. The simulator toy as recited in claim 1 further comprising:
a handle detachably connected to and extending outwardly from the lower portion of the body.

3. The simulator toy as recited in claim 1 wherein the rotation plate and projectable structures are made of a transparent material.

4. The simulator toy as recited in claim 3 further comprising:
a plurality of removable projectable structures, wherein the rotation plate is provided with a plurality of slots for receiving the removable projectable structures.

5. The simulator toy as recited in claim 4 wherein each of the plurality of removable projectable structures comprises a transparent sheet having a pattern printed thereon and having an upper portion which extends upwardly from the upper surface of the rotation plate and a lower portion which extends downwardly from the lower surface of the rotation plate.

6. The simulator toy as recited in claim 5 wherein the pattern is a ghost image.

7. The simulator toy as recited in claim 1 wherein the body is open in the front portion between the upper and lower portions, and wherein the body further includes means for supporting the rotation plate for rotational movement in the front portion of the portion.

8. The simulator toy as recited in claim 7 wherein the support means includes a stub shaft extending upwardly from within the body and complementary magnetic means for holding the rotation plate axially on the stub shaft.

9. The simulator toy as recited in claim 8 wherein the complementary magnetic means comprises a metallic ring embedded in the lower surface of the rotation plate and being concentric with a central bore of the rotation plate, and a magnetic ring disposed around the stub shaft at a lower end thereof.

10. The simulator toy as recited in claim 1 further comprising a supporting arm having a distal end supporting the projecting light source and having a proximal end operatively connected to the turning knob, and a branch plate connected to the supporting arm, wherein the projection member is formed on a distal end of the branch plate.

11. The simulator toy as recited in claim 1 wherein the drive means comprises a motor, a battery power supply for powering the motor and illuminating the light source, switch means for turning the drive means on and off, and gear means disposed between the rotation plate and the motor for imparting rotary motion of the motor to the rotation plate.

12. The simulator toy as recited in claim 11 further comprising transmission means connected to the gear means for changing the speed of rotation of the rotation plate, and a speed selection switch for shifting the transmission means.

13. The simulator toy as recited in claim 12 further comprising timing means, connected to the gear means and the switch means, for determining a time period for rotation of the rotation plate.

14. The simulator toy as recited in claim 13 further comprising score indicating means, movable in response to rotation of the rotation plate, for indicating the time period of rotation of the rotation plate from the begnning of rotation to the time when the projection piece hits an abutment of the rotation plate.

15. The simulator toy as recited in claim 14 further comprising a score indicator return means, adjacent the score indicating means, for returning the score indicating means to a beginning position.

16. The simulator toy as recited in claim 15 wherein the actuating means comprises a clutch disposed between the gear means and the rotation plate.

17. The simulator toy as recited in claim 13, further comprising noise making means for making a noise when the rotation of the rotation plate is prevented by the projection member hitting a projection of the rotation plate.

* * * * *